United States Patent
Guyomarc'h

(10) Patent No.: US 9,505,997 B2
(45) Date of Patent: Nov. 29, 2016

(54) METHOD AND SYSTEM FOR SUPPLYING THERMAL ENERGY TO A THERMAL PROCESSING SYSTEM FROM THE GASIFICATION OF DRY, CARBON-CONTAINING RAW MATERIALS, FOLLOWED BY OXIDATION, AND INSTALLATION FOR OPERATING THIS SYSTEM

(75) Inventor: Raymond François Guyomarc'h, Caussade (FR)

(73) Assignee: SEE—Soluções, Energia e Meio Ambiente Ltda., São Paulo-SP (BR)

( * ) Notice: Subject to any disclaimer, the term of this patent is extended or adjusted under 35 U.S.C. 154(b) by 890 days.

(21) Appl. No.: 13/576,636

(22) PCT Filed: Aug. 8, 2010

(86) PCT No.: PCT/BR2010/000338
§ 371 (c)(1),
(2), (4) Date: Aug. 1, 2012

(87) PCT Pub. No.: WO2011/091488
PCT Pub. Date: Aug. 4, 2011

(65) Prior Publication Data
US 2012/0298921 A1    Nov. 29, 2012

(30) Foreign Application Priority Data

Feb. 1, 2010   (FR) .................................... 10/00378

(51) Int. Cl.
C10J 3/80       (2006.01)
C10J 3/00       (2006.01)
C10J 3/46       (2006.01)

(52) U.S. Cl.
CPC   *C10J 3/80* (2013.01); *C10J 3/463* (2013.01); *C10J 2300/0909* (2013.01); *C10J 2300/0969* (2013.01); *C10J 2300/1815* (2013.01); *Y02P 20/129* (2015.11)

(58) Field of Classification Search
CPC combination set(s) only.
See application file for complete search history.

(56) References Cited

U.S. PATENT DOCUMENTS 1,163,922  A   12/1915  Hillhouse
2,128,262  A    8/1938  Newman
(Continued)

FOREIGN PATENT DOCUMENTS

EP    1 136 542 A1   9/2001
EP    1 933 087 A2   6/2008
(Continued)

OTHER PUBLICATIONS

Kong et al., "Hydrogen Production from Biomass Wastes by Hydrothermal Gasification," Energy Sources, Part A, 30:1166-1178, 2008.
(Continued)

*Primary Examiner* — Matthew Merkling
(74) *Attorney, Agent, or Firm* — Volpe and Koenig, P.C.

(57) ABSTRACT

The invention comprises a thermal power supply process for a treatment system for raw material. It also refers to a system operating this process and a facility operating said system. The process comprises steps of gasification of dry raw material containing carbon (MPCS) in a first reactor by a gaseous flow of gasification containing $CO_2$, oxidation of gasification gases by oxygen holders in a second reactor and an activation of the oxygen holders as used during the oxidation in a third reactor.

9 Claims, 2 Drawing Sheets

(56) References Cited

U.S. PATENT DOCUMENTS

| | | |
|---|---|---|
| 2,602,809 A | 7/1952 | Dickinson |
| 2,656,255 A | 10/1953 | Johnson |
| 2,772,954 A | 12/1956 | Jéquier |
| 2,864,688 A | 12/1958 | Reed |
| 3,031,287 A * | 4/1962 | Benson .................. C01B 3/061 423/439 |
| 3,201,215 A | 8/1965 | Negra et al. |
| 3,442,620 A | 5/1969 | Huebler et al. |
| 3,915,840 A | 10/1975 | Gladrow et al. |
| 4,040,976 A | 8/1977 | Greene |
| 4,070,160 A | 1/1978 | Cottle |
| 4,265,868 A * | 5/1981 | Kamody .................. C01B 3/34 252/373 |
| 4,272,555 A | 6/1981 | Davis et al. |
| 4,343,624 A | 8/1982 | Belke et al. |
| 4,382,915 A | 5/1983 | Sadhukhan et al. |
| 4,725,381 A | 2/1988 | Pinto |
| 5,213,587 A | 5/1993 | Ekström et al. |
| 6,444,179 B1 | 9/2002 | Sederquist |
| 6,648,949 B1 | 11/2003 | Der et al. |
| 7,494,574 B2 | 2/2009 | Kong et al. |
| 7,780,749 B2 * | 8/2010 | Kulkarni et al. ............... 48/61 |
| 2002/0127178 A1 | 9/2002 | Kindig et al. |
| 2004/0009378 A1 | 1/2004 | Lightner |
| 2004/0123601 A1 | 7/2004 | Fan |
| 2004/0253166 A1* | 12/2004 | Kruesi ...................... B09B 3/00 423/445 R |
| 2005/0175533 A1 | 8/2005 | Thomas et al. |
| 2006/0130401 A1 | 6/2006 | Giglio et al. |
| 2008/0078122 A1 | 4/2008 | Clark |
| 2008/0134579 A1 | 6/2008 | Kulkarni et al. |
| 2008/0184621 A1 | 8/2008 | Clark |
| 2009/0000194 A1* | 1/2009 | Fan et al. ................... 48/199 R |
| 2009/0049748 A1 | 2/2009 | Day et al. |
| 2009/0126271 A1 | 5/2009 | Kyo et al. |
| 2009/0148927 A1 | 6/2009 | Schroeder et al. |
| 2009/0211444 A1 | 8/2009 | Lissianski et al. |
| 2010/0132633 A1 | 6/2010 | Liu et al. |
| 2010/0293845 A1 | 11/2010 | Zeman et al. |
| 2011/0088321 A1* | 4/2011 | Kim ........................ C10B 49/02 48/89 |
| 2011/0179762 A1* | 7/2011 | Kim ........................ F02C 3/28 60/39.12 |
| 2011/0303875 A1 | 12/2011 | Hoteit et al. |
| 2012/0171588 A1 | 7/2012 | Fan et al. |
| 2014/0158940 A1* | 6/2014 | Navaee-Ardeh .......... C01B 3/36 252/373 |

FOREIGN PATENT DOCUMENTS

| | | |
|---|---|---|
| GB | 521415 | 5/1940 |
| GB | 757333 | 9/1956 |
| GB | 2 125 430 A | 3/1984 |
| JP | H06 319520 A | 11/1994 |
| JP | H10 259384 A | 9/1998 |
| JP | 2002 173301 A | 6/2002 |
| JP | 2006 008872 A | 1/2006 |
| JP | 2009 242248 A | 10/2009 |
| WO | 01/68789 A1 | 9/2001 |
| WO | 0168789 | 9/2001 |
| WO | 2004/067933 A2 | 8/2004 |
| WO | 2005/003632 A1 | 1/2005 |
| WO | 2007/082089 A2 | 7/2007 |
| WO | 2008/036902 A2 | 3/2008 |
| WO | 2008/097691 A1 | 8/2008 |
| WO | 2009/055829 A1 | 4/2009 |

OTHER PUBLICATIONS

Patterson, deceased, "A French-English Dictionary for Chemists," Second Edition (copyright 1954).

Mimori et al., "A New Reversible Chemical System for Efficient Utilization of Carbonaceous Compounds," Energy vol. 19, No. 7, pp. 771-778, 1994.

Rezvani et al., "Comparative assessment of coal fired IGCC systems with CO2 capture using physical absorption, membrane reactors and chemical looping," Fuel 88 (2009) 2463-2472.

Li et al., "Clean coal conversion processes—progress and challenges," Energy & Environmental Science, 2008, 1, 248-267.

Centi et al., "Opportunities and prospects in the chemical recycling of carbon dioxide to fuels," Catalysis Today, 148 (2009) 191-205.

* cited by examiner

METHOD AND SYSTEM FOR SUPPLYING THERMAL ENERGY TO A THERMAL PROCESSING SYSTEM FROM THE GASIFICATION OF DRY, CARBON-CONTAINING RAW MATERIALS, FOLLOWED BY OXIDATION, AND INSTALLATION FOR OPERATING THIS SYSTEM

This application is a 35 U.S.C. §371 national phase application of PCT/BR2010/000338, which was filed Aug. 8, 2010 and is incorporated herein by reference as if fully set forth.

The invention comprises a process for the supply of thermal power from a thermal treatment system for raw material. It also comprises a system performing said process and a raw material thermal treatment facility including said system.

The thermal treatment of wet and/or dry raw materials and/or manufactured products for their drying/dehydration and/or to obtain specific characteristics is perfectly known and coded by the different players in the industry.

The thermal treatment of wet materials needs, on one hand, a gas flow for treatment, also called heat bearing gas, and, on the other hand, the thermal power required to perform the treatment, being said thermal power transferred to the raw material to be treated, thanks to the treatment gas flow.

The most widely used treatment gas flows are hot air, incomplete combustion gases, water steam or any heating gas with no other purpose than to transport and spread its thermal capacity to the medium to be treated. Carbon dioxide, $CO_2$, was the object of important developments such as heating gas for the thermal treatment of carbon-containing materials due to its properties such as the chemical stability and neutrality with most treatment media, and the particular interactions which are naturally developed with carbon-containing materials, most particularly when carbon-containing materials are wet, under specific conditions for these interactions: temperature, pressure, water steam saturation grade, etc.

The thermal power as required for the treatment of raw materials is supplied by means usually known as "thermal media". Said thermal treatment processes and systems depend on the external supply of thermal energies.

In the last few years, numerous processes for the thermal treatment of raw material have been developed to simultaneously generate the heating gas $CO_2$ and the required heat for the treatment from dry materials containing carbon through their oxycombustion. Said oxycombustion produces, on the other hand, a gas flow of $CO_2$ and the thermal power required to make the thermal treatment.

However, these processes and systems are again dependent on a continuous flow of oxygen.

In summary, current processes and systems are dependent:

either on a continuous external supply of thermal power as required for the treatment;

or on a continuous external supply of oxygen as required for oxycombustion.

However, these processes and systems demand high energy and have negative impacts on the environment.

An object of the present invention is to avoid the inconveniences as mentioned.

Another object of the invention is to present a process and system for the supply of a thermal treatment system for raw material consuming less power.

Another object of the present invention is to propose a supply process and system for a thermal treatment system allowing to release said system from maintaining continuous external supply.

Finally, an object of the invention is to propose a supply process and system for a thermal treatment system, reducing the negative impacts of such system to the environment.

The invention allows to reach the objects as mentioned by means of a process to supply thermal power to a thermal treatment system for raw material, said process comprising at least one iteration of the steps below:

gasification in a first so-called gasification reactor of dry raw material containing carbon with a gaseous flow of gasification containing $CO_2$ at high temperature and oxygen $O_2$, said gasification supplying a first gaseous flow comprising $CO_2$, molecules of carbon monoxide (CO) and di-hydrogen ($H_2$) and eventually water steam ($H_2O_g$).

oxidation in a second so-called oxidation reactor by oxygen holders in oxidized state (MeO) of said molecules of carbon monoxide (CO) and di-hydrogen ($H_2$) as present in said first gaseous flow, said oxidation supplying a second gaseous flow at high temperature comprising $CO_2$ and water steam ($H_2O_g$) and oxygen holders in reduced state (Me);

activation within a third so-called activation reactor of said oxygen holders in reduced state with a gaseous flow comprising elements of oxygen, said oxidation supplying oxygen holders in oxidized state and an excess of thermal power;

supply of a part of the thermal power of said second gaseous flow and/or said thermal excess from said activation to said thermal treatment system for raw material; and increase of temperature of the gaseous flow of gasification with at least one part of the thermal excess from the activation of oxygen holders to increase said gaseous flow of gasification to the gasification temperature.

In the present disclosure:

gaseous flow of gasification designates a gaseous flow of $CO_2$ as used for the gasification of dried raw material;

gaseous flow of treatment designates a gaseous flow used by the thermal treatment system to perform the thermal treatment of raw materials; and carried gaseous flow of treatment designates the gaseous flow of treatment in the exit of the treatment system, obtained after the treatment of a load of raw material.

In this step of the disclosure, the gasification of the dry raw material is performed with a supply of pure oxygen, once the process of the invention still depends on a source of $O_2$ as needed for the thermal requirements of said gasification. We will detail further below how the system and the process of the invention are released from their dependence on an external supply of oxygen.

On the other hand, apart from the dry raw material, the process of the invention does not need a continuous supply of thermal and/or electrical power from an external source of energy. The sole external energy as consumed by the process of the invention is the thermal and/or electrical power as required for the start of the gasification step early in the process. Once the gasification starts, the process of the invention allows to supply enough power to perform all steps in the process. Therefore, as we will detail further below in the disclosure, the heat of the second gaseous flow is sufficient to supply the thermal treatment system with thermal power. The power available in the thermal capacity of the second gaseous flow and the thermal power as supplied by the activation of oxygen holders is sufficient to bring the gaseous flow of gasification to the gasification temperature. All the energy required to increase the temperature of said gaseous flow of gasification can be eventually obtained with the thermal complementation as supplied by an oxygen ($O_2$) supply in the gasification reactor. Said supply is then limited to the additional thermal requirements, each molecule of $O_2$ oxidizes two molecules of hydrogen ($H_2$) and/or atoms of C to make two $H_2O$ and/or two CO (or one and another as a function of the initial composition of the raw material containing carbon), thus generating the thermal power as useful for the reactions of the process of the invention. A new gasification step can then be performed and therefore it is a new iteration of the steps of the process.

In a particularly advantageous first way of embodiment, the gas flow of treatment as used by the treatment system may comprise, at least in part, the second gaseous flow containing $CO_2$ (released at least in part of the water steam it contains). In this way of embodiment, the supply of at least one part of the thermal power to the thermal treatment system may comprise the supply of at least one part of the second gaseous flow to the thermal treatment system of raw material. The second gaseous flow then constitutes the means of transportation of the thermal power to the thermal treatment system.

In this first way of embodiment, the process of the invention supplies the thermal treatment system not only in thermal power, but equally in gaseous flow for treatment.

Always in the first way of embodiment, the process of the invention may comprise a step of temperature reduction of said part of the second gaseous flow as supplied to the thermal treatment system before its use as a gaseous flow of treatment.

Temperature reduction may be performed through a thermal exchange or by a mixture with a gaseous flow containing cold $CO_2$.

Always in the first way of embodiment, the process of the invention may comprise a step of regulation of the $CO_2$ concentration in the second gaseous flow before its use as a gaseous flow of treatment in the thermal treatment system. The regulation of $CO_2$ concentration of the second gaseous flow may be performed by mixture with the latter of a quantity of pure, cold ($\leq 20°$ C.) and dry $CO_2$, under the desired proportion.

In that first way of embodiment, the process of the invention may comprise recycling in closed circuit of at least one part of the $CO_2$ as present in the gaseous flow of thermal treatment as carried in the outlet of the thermal treatment system, to constitute, at least in part, the gaseous flow of gasification, wherein said closed circuit recycling comprises a step of separation between $CO_2$ and the water steam present in said gaseous flow of treatment as loaded.

Said recycling allows the use, at least in part, of the same gaseous flow of $CO_2$ at the same time as a gaseous flow of gasification as a gaseous flow of treatment and the regulation of said gaseous flow of treatment.

We will see later in this disclosure that said gaseous flow of $CO_2$ may be advantageously supplied by gasification.

In a second way of embodiment, the supply of at least one part of the thermal power to the treatment system may comprise a transference of thermal power to a gaseous flow of thermal treatment. In that case, the thermal transference can be performed by exchangers which are known by the experts in the art.

Always in this second way of embodiment, the process of the invention may comprise recycling in a closed circuit of at least one part of the $CO_2$ in the second gaseous flow to constitute said gaseous flow of gasification.

Recycling may comprise a step of separation between $CO_2$ and the water steam as present in the second gaseous flow by systems which are known by the experts in the art.

Advantageously, the activation of oxygen holders in reduced state may comprise the oxidation of said carriers in reduced state by pre-heated atmospheric air.

In case of the first way of embodiment, pre-heating of atmospheric air may advantageously comprise a thermal power transference from the gaseous flow of thermal treatment as carried at the outlet of the thermal treatment system to said atmospheric air after thermal treatment.

In the case of the second way of embodiment, pre-heating of the atmospheric air can advantageously comprise a transference of thermal power after the second gaseous flow in the outlet of second reactor to said atmospheric air.

In the case of the first way of embodiment, the transference of thermal power from the gaseous flow of thermal treatment system as carried in the outlet of the thermal treatment system to said atmospheric air performs the separation between $CO_2$ and the water steam as present in said gaseous flow of thermal treatment system as carried.

In case of the second way of embodiment, the transference of thermal power from the second gaseous flow to said atmospheric air performs the separation between $CO_2$ and the water steam as present in said second gaseous flow.

According to another aspect of the invention, we propose a thermal power feeding system for a thermal treatment system of raw materials, comprising:

a first gasification reactor for raw material containing dry carbon, with a gaseous flow of gasification comprising $CO_2$ at high temperature and the addition of oxygen ($O_2$) allowing an eventual thermal complementation useful for the gasification reactions, said reactor supplying a first gaseous flow containing $CO_2$, molecules of carbon monoxide (CO) and di-hydrogen ($H_2$) and eventually water steam ($H_2O_g$).

a second oxidation reactor by oxygen holders in oxidized state (MeO) of said molecules of carbon monoxide (CO) and di-hydrogen ($H_2$) as present in said first gaseous flow, said second reactor supplying a second gaseous flow at high temperature comprising $CO_2$ and water steam ($H_2O_g$) and oxygen holders in reduced state (Me);

a third activation reactor of said oxygen holders in reduced state with a gaseous flow containing elements of oxygen, said reactor supplying oxygen holders in oxidized state and an excess of thermal power;

means to supply at least a part of the thermal power of said second gaseous flow and/or said thermal excess from said activation to said thermal treatment system for raw material; and means to increase the temperature of said gaseous flow of gasification with at least one part of the thermal excess from the activation of oxygen holders to increase said gaseous flow of gasification to the gasification temperature.

On the other hand, the system may comprise mechanical means of transportation of the oxygen holders from the second reactor to the third reactor and/o from the third reactor to the second reactor.

Advantageously, the system of the invention may contain a recycling circuit in closed circuit of at least a part of the $CO_2$ as present in the second gaseous flow as being the gaseous flow of gasification, wherein said recycling circuit contains means of separation between $CO_2$ and water steam.

In a particularly advantageous version of the system of the invention, the recycling circuit turns on, at least indirectly, the second reactor, the thermal treatment system, the means to separate $CO_2$ from water steam, the means to increase the temperature of the gaseous flow of gasification and the first reactor.

According to another aspect of the invention, we propose a thermal treatment system for raw material integrating a power feeding system of the invention.

As per still other aspect of the invention, we propose a thermal treatment facility for raw material containing a thermal treatment system for raw material and a power feeding system for said thermal treatment system of the invention.

Other advantages and characteristics will appear from the analysis of the detailed description of a non-limitative way of embodiment and the attached figures:

FIG. 1 is a schematic representation of a preferred version of a facility of the invention.

Figure 1:
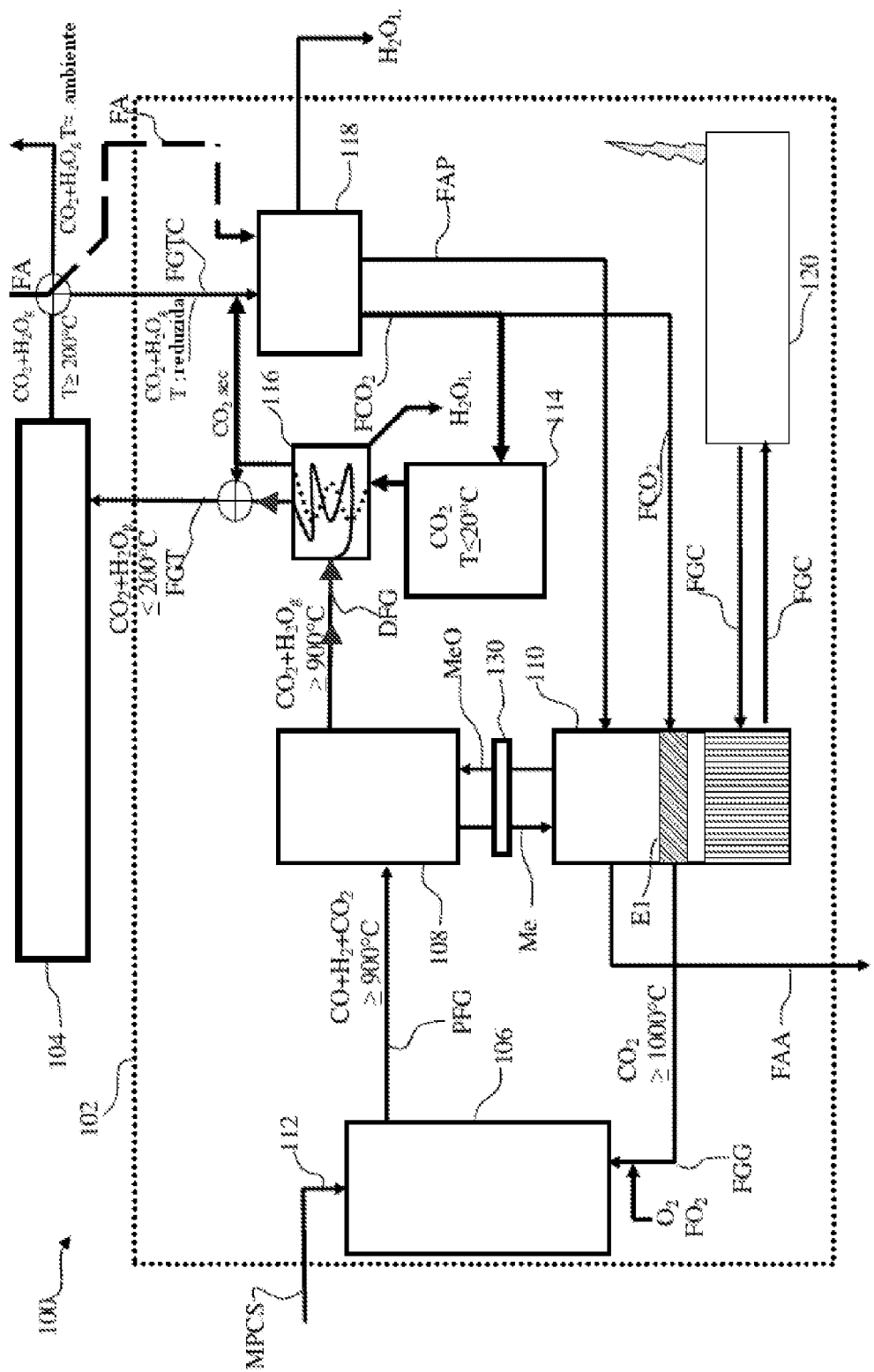
FIG. 1 is a schematic representation of a first version of a facility of the invention.

The facility 100 comprises a thermal power supply system 102 for a thermal treatment facility 104.

The feeding system 102 comprises a gasification reactor 106, an oxidation reactor 108 and an activation reactor for oxygen holders 110.

The gasification reactor 106 holds a feeding chamber (not shown) of carbon-containing material MPCS under $CO_2$ control. That feeding chamber is controlled by $CO_2$ to avoid any entrance of air in the gasification reactor 106 and guarantee the hermeticity of said gasification reactor. It contains a feeding mouth (not shown) and an introduction device (not shown) of the carbon-containing material MPCS in the gasification reactor.

The gasification reactor 106 is fed, on one hand, with dry raw material containing carbon MPCS 112 and, on the other hand, a gaseous flow of gasification FGC containing $CO_2$ at a temperature of 1000° C. or higher. Eventually, a thermal complement can be generated in the center of the gasification reaction by the introduction of oxygen ($O_2$) in the gaseous flow of gasification FGG. Each mol of this oxygen is introduced then oxidizes two moles of $H_2$ and/or two moles of C, generating the corresponding thermal power in the core of the gasification reactor. Said eventual complement allows to control the thermal regulation of the reactions in said gasification reactor and increase the yielding of the reactions so to increase the final production of the energies and reactions of the process of the invention.

In the gasification reactor 106, the dry raw materials containing carbon MPCS are submitted to the gaseous flow of gasification FGG holding raw materials containing carbon at a high temperature around 1000/1100° C. At that temperature, the interaction between $CO_2$ and the dry raw material containing carbon is full. The thermal reaction is violent and instantaneous. Carbons C composing raw material MPCS react with the molecular oxygen O of that same raw material containing carbon MPCS to form carbon monoxides CO per the reaction:

C+O→CO

Residual carbons of the dry raw material containing carbon MPCS are taken to the inlet temperature of reactive $CO_2$. They are predominantly oxidoreductors at that temperature and react with $CO_2$ after the following reaction, called "BOUDOUART balances" at 1000° C.

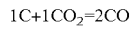

The gaseous set, called first gaseous flow PFG, when exiting the gasification reactor 106, is under a temperature ≥900° C. It is composed of:

CO produced by the pyrolisys of dry raw materials containing carbon (MPCS) and the conversion from "reactive $CO_2$" to CO (over residual carbons at the optimal temperature of its oxido-reductive property);

$H_2$ as released during the molecular decomposition of dry raw materials containing carbon (MPCS) created by pyrolisys as generated by the "reactive $CO_2$" at the temperature of 1000/1100° C.;

$H_2O_g$ as produced by the forced oxidation of $H_2$ useful for the thermal complement as required for the pyrolysis of said dry raw materials containing carbon (MPCS);

eventually, the excess of $CO_2$ from the gaseous flow of gasification FGG.

The excess of $CO_2$ is the thermal vector that may be used, as a complementation to "reactive $CO_2$", by the need to supply thermal power for gasification and the BOUDOUART endothermal reaction. That first gaseous flow PFG is under a temperature of 900° C. or higher at the outlet of the gasification reactor 106.

The first gaseous flow PFG is then introduced into the oxidation reactor 108. That oxidation reactor 108 is fed, on one hand, by the first gaseous flow PFG and, on the other hand, by oxygen holders in oxidized or activated state marked as MeO.

Activated oxygen holders MeO oxidize the molecules of carbon monoxide CO and di-hydrogen $H_2$ as present in the first gaseous flow PFG of the following reactions:

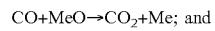

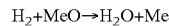

Said oxidation is performed by the reduction of the activated oxygen holders MeO in deactivated oxygen holders Me changing its oxygen with the gaseous molecules CO and $H_2$. In fact, said molecules are eminently oxidoreductive and combustible at the outlet temperature of the gasification 106 reactor 1 which is equal to 900° C. or higher.

The gaseous set called second gaseous flow DFG exiting from the oxidation reactor 108 comprises:

$CO_2$ resulting from the oxidation reaction from the molecules of CO;

$CO_2$ initially present in the first gaseous flow; and $H_2O_g$ resulting from the oxidation reaction from the molecules of $H_2$.

That second gaseous flow DFG comes out from the oxidation reactor 108 at a temperature of 900° C. or higher and will serve as a gaseous flow of treatment in the thermal treatment system.

However, the second gaseous flow DFG at the outlet of the oxidation reactor 108 is at a temperature ≥900° C. It is therefore hotter than required for most thermal treatment operations for which it is produced. Furthermore, it contains about 34% water steam (this rate is relative to the chemical composition of MPCS as put into operation in the gasification reactor). It is convenient to temper this gaseous flow before its introduction into the thermal treatment zone of the thermal treatment system 104, by a supply of cold and dry $CO_2$, coming from a reservoir of conditioned $CO_2$ 114.

Cold and dry $CO_2$ is mixed with the second gaseous flow DFG by a mixture device 116 under the desired proportions to obtain a gaseous flow of treatment FGT under the conditions of said treatment.

The gaseous flow of treatment FGT composed of $CO_2$ and water steam is under a temperature of 200° C. or lower in the present example. This gaseous flow of treatment is supplied to the thermal treatment system 104 for raw material.

The thermal treatment system 104 supplies at the outlet a loaded gaseous flow of treatment FGTC composed of the gaseous flow of treatment FGT and the water steam coming from the treatment raw material. Bearing in mind the continuous production of energy and its corollary in $CO_2$, an equivalent part of the gaseous flow of treatment FGT should be eliminated. In the outlet of the thermal treatment system 104, that equivalence in gaseous flow of treatment FGTC is excluded. This $CO_2$ may be then released to the atmosphere with no prejudice to the environment, since it results from renewable material; furthermore, the main energy generated to the process/system of the invention is produced not generating or expelling hazardous $CO_2$. Said $CO_2$ can also be recycled in other applications after de-humidification and/or such as in a microalga culture facility to produce the biomass "raw material".

The recycled loaded gaseous flow of treatment FGTC is supplied to an absorption refrigerating system 118, as well as a flow of atmospheric air FA. The refrigerating system performs thermal exchange between the loaded gaseous flow of treatment FGTC and the flow of atmospheric air FA. Said thermal exchange transfers the heat of the loaded thermal treatment gaseous flow FGTC to the flow of atmospheric air FA. Said thermal exchange allows to sufficiently refrigerate the loaded gaseous flow for thermal treatment FGTC to condensate water steam and separate $CO_2$ and water steam. In the outlet, the refrigerating system supplies liquid water $H_2O_L$, a flow of pre-heated air FAP, relative to the temperature corresponding to the thermal treatment stage; let the final temperature of the treatment be of 30° C. and, to dry wood, it can go to 130° C. and above (higher than 300° C. if this is a high temperature treatment process) and a flow of noted recycled $CO_2$ $FCO_2$.

The flow of pre-heated air FAP is supplied to the activation reactor 110 for the holders of deactivated oxygen. Said reactor 110 equally receives deactivated oxygen holders (or in reduced state) Me as supplied by the oxidation reactor 108. These deactivated oxygen holders Me are put in contact with the flow of pre-heated atmospheric air FAP. The molecules of oxygen $O_2$ as present in the flow of pre-heated atmospheric air FAP oxidize (activate) deactivated oxygen holders as per the following reaction:

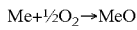

$$Me + \tfrac{1}{2} O_2 \rightarrow MeO$$

The oxygen holders are activated and able to be supplied to the oxidation reactor 108 to serve in a new oxidation.

The activation reactor 110 supplies, at its outlet, activated oxygen holders MeO which will be supplied to the oxidation reactor 108 and a flow of hot air poor in oxygen FAA. Such flow of air poor in oxygen FAA is still hot and may be used by means of a thermal exchanger (not shown) to condition the gaseous flow of treatment FGT and/or to pre-heat the flow of noted recycled $CO_2$ $FCO_2$ before its introduction in the exchanger E1 of the activation reactor 110.

Being the oxidation reaction of the oxygen holders very exothermal, an important excess of thermal power is created within the activation reactor 110, corresponding to more than 85% of the intrinsic power potential of the used MPCS.

This thermal excess is explored by a first thermal exchanger E1 to which a part of the flow of noted $CO_2$ $FCO_2$ (cold or pre-heated by the flow FAA in an exchanger not shown) is supplied. Said $CO_2$ is heated at a temperature of 1000° C. or higher in a thermal exchanger E1. The gaseous flow of $CO_2$ as obtained at the outlet of said thermal exchanger E1 is used as a gaseous flow of gasification FGG.

The other part of the flow of cold $CO_2$ (≤20° C.) $FCO_2$ is used to supply the reservoir 114 of conditioned $CO_2$.

The thermal excess as created in the activation reactor 110 is equally explored by a second thermal exchanger allowing to elevate the temperature of a gaseous co-generation flow FGC serving to generate thermodynamic power under the form of water steam at high pressure and high temperature for co-generation of mechanical energy and/or electricity in a system 120 which may contain a turbo alternator.

The feeding system contains, on the other hand, a mechanical device 130 allowing to transport the oxygen holders from the oxidation reactor 108 to the activation reactor 110 and vice-versa.

Figure 2:
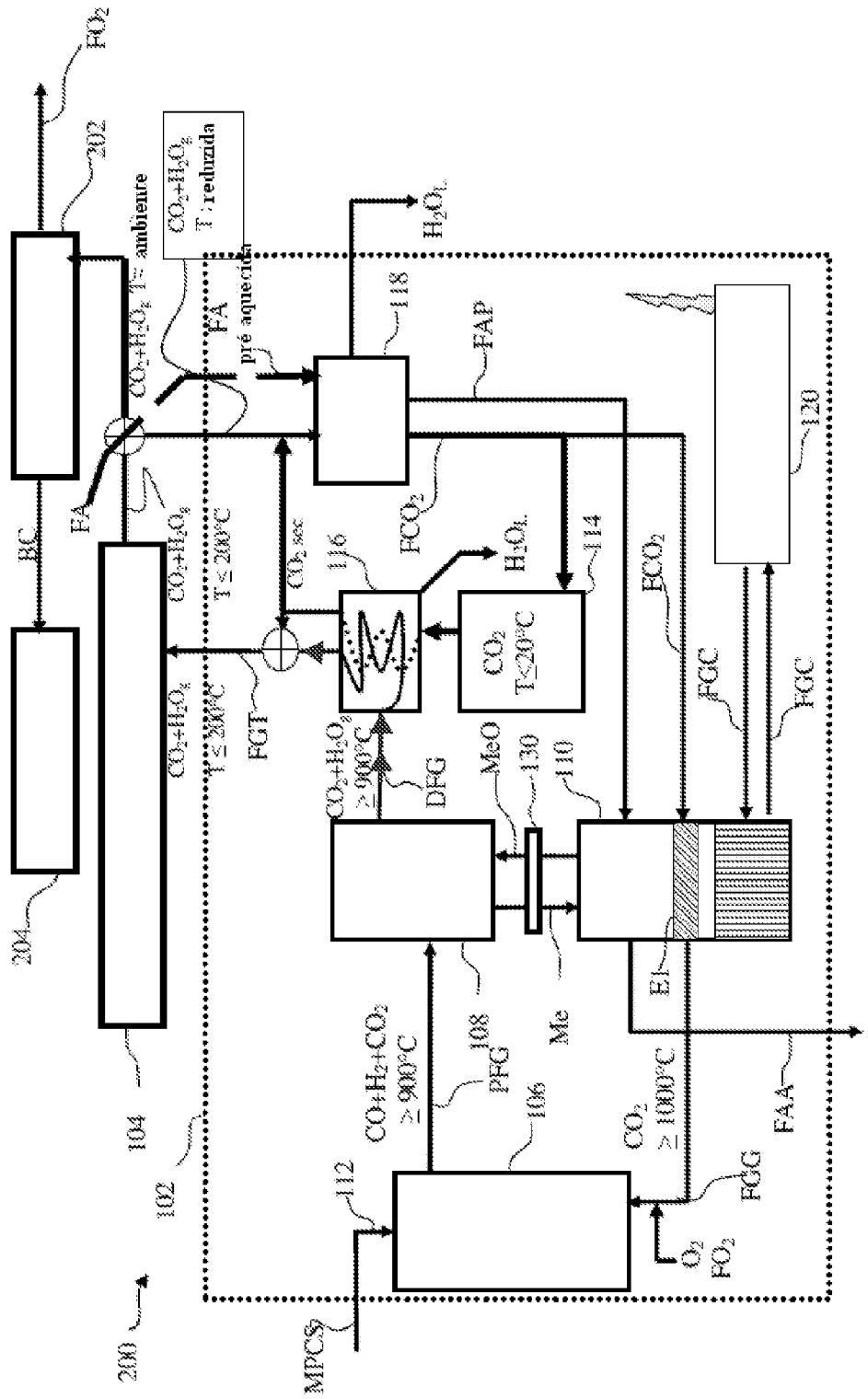
FIG. 2 is a schematic representation of a second version of a facility of the invention.

FIG. 2 is a schematic representation of a second version of a facility of the invention.

The facility 200 as shown on FIG. 2 contains all the facility elements 100 as shown on FIG. 1.

On the other hand, the facility 200 contains a bioreactor 202 containing microalgae.

A part of the $CO_2$ as present in the loaded gaseous flow of treatment FGTC is refrigerated and injected in the bioreactor 202. In the alga culture bioreactor 202, carbon dioxide $CO_2$ is used by photosynthesis as performed by microalgae. Photosynthesis produces, on one hand, the biomass containing carbon BC and, on the other hand, a gaseous flow of oxygen $FO_2$ by separating the carbon element <<C>> from the molecule of dioxygen <<$O_2$>>.

The carbonated biomass BC as obtained is supplied to a biomass conditioning system 204 which may be:

a system to extract essential oils from microalgae with high content of lipids and feed-pharmaceutical molecules as used in the pharmacopea and/or hydrocarbons for refining; at the end of that extraction, about 30% of the biomass remain in the form of coal, which may be returned to the gasifier 106;

or e.g. a drying system to be conditioned before its introduction into the gasification reactor 106.

The gaseous oxygen flow $FO_2$ may be supplied to the system of the invention, e.g. at the level of the gasification reactor 102 to complement the gasification of carbon-containing material in the reactor 102. Therefore, the autonomy of the process is reached, getting it free from external sources of oxygen (as thermal means).

Advantageously, the production of carbonated biomass in this second way of embodiment stimulates global yielding.

We will now disclose the power balance of the process of the invention put into operation in the facility 100 shown on FIG. 1, taking the example of a load of 1 kg of biomass as dry raw material containing carbon MPCS. The average chemical composition of 1 kg of biomass is as follows:

C≈50%: i.e. for 1 kg of MPCS: 0.500 kg, i.e. 41.67 moles. Therefore, the heating power is:

41.67×394 kJ/mol=16,417.98 kJ $O_2$≈44%: i.e. per 1 kg of MPCS: 0.440 kg i.e. 13.75 moles of $O_2$, therefore 27.50 "O"; and $H_2$≈6% i.e. per 1 kg of MPCS: 0.060 kg, i.e. 29.76 moles. Therefore, the heating power is:

29.76×242 kJ/mol=7,201.92 kJ i.e. an intrinsic energetic power of:

16,417.98+7,201.92=23,619.90 kJ

At the Outlet of the Gasification Reactor

Following this composition, the "endogenous" gasification of that MPCS in the gasification reactor 106 will generate:

27.50 moles of CO;
14.17 moles of C; and
29.76 moles de $H_2$;
i.e., for 1 kg of (MPCS/biomass), 0.830 kg under gaseous form and 0.170 kg under the form of solid carbon, i.e. biomass coal.

These 14.17 moles of carbon, at a temperature ≥1,000° C., will react with the same quantity of moles of $CO_2$ and reduce them to form 28.34 moles of CO.

The thermochemical reaction $CO_2+C=2CO$ is endothermal, as per the reactions:

$$CO_2-\tfrac{1}{2}O_2=CO+O+283 \text{ kJ/mol}$$

$$C+\tfrac{1}{2}O_2 \text{ (from } CO_2)=CO-111 \text{ kJ/mol}$$

i.e. a thermal deficit of 172 kJ/mol of $CO_2$ "converted" by this reaction.

Finally, a composition for the first gaseous flow is:
55.84 moles of CO, thus the useful thermal power to compensate the endothermal requirements is:

14.17 moles of $CO_2 \times$172 kJ/mol=2,437.24 kJ+the thermal capacity of MCPS and reactive $CO_2$ useful for gasification and the conversion=1,786.14 kJ.

29.76 moles of $H_2$;
wherein a power requirement for the gasification is:

$$2{,}437.24+1{,}786.14 \text{ kJ}=4{,}223.38 \text{ kJ}$$

The molecular interaction in this pyrolytic medium is considered athermal. The exothermal oxidation of C by the oxygen of the molecular composition compensates the endothermal cracking of the molecules of the system. That reaction should be computed for the thermal fluid and the general thermal exchange supplying useful power, in sensitive heat to reach the temperature of said pyrolysis. It is also a role of the thermal fluid to supply the endothermal compensation power (and the oxygen) for the reaction of the carbons which do not find that oxygen in the molecular composition of their media. The global balance of the reactions in that gasification reactor is endothermal.

The thermal supply useful for the generation of said reactions over 1 kg (MPCS/biomass) is of 4,223.38 kJ.

If said gaseous flow FGG is composed of just 14.17 moles of $CO_2$ useful for the conversion reaction, during its transit in the activation reactor 110, it is at a temperature of more than 1000° C., i.e. a recovered thermal capacity of only: 574.344 kJ.

Therefore, 4,223.38−574.344=3,649.036 kJ of thermal capacity are missing for the reactions in the gasification reactor 106.

As we will see in the demonstration sequence, the power is available (as generated by the reaction chain) to supply such thermal capacity. On the other hand, this induces the transport of such power: from the source to the gasification reactor 102. For that, a complement of recycled $CO_2$ is required (an external supply is then useful to start the process).

To generate such thermal power, an injection of $O_2$ can be effected with a gaseous flow of gasification FGG at its inlet in reactive phase in the gasification reactor 106.

In the pyrolytic media of the invention, at 1000/1100° C., molecular hydrogen reacts initially with the available oxygen and the process of the invention (in this case) has 29.762 moles of $H_2$, thus the full heating power is: 7,202.404 kJ.

If this is the chosen option, 15.079 moles of hydrogen are then required to produce the missing thermal capacity. Each injected mol of $O_2$ will react with two moles of hydrogen to produce two moles of $H_2O$, so that 7.54 moles of $O_2$ will then be required to compensate the lack of thermal capacity as required for this reaction. 14.683 moles of $H_2$ will remain and react with CO to obtain the reaction sequence in the oxidation reactor 108.

At the Outlet of the Oxidation Reactor
The heating power of 14.683 moles of $H_2$ is:

$$14.683 \times 242 \text{ kJ/mol}=3{,}553.286 \text{ kJ; and}$$

the heating power of 55.84 moles of CO is:

$$55.84 \times 283 \text{ kJ/mol}=15{,}802.72 \text{ kJ.}$$

The oxidation of CO and $H_2$ as present in the first gaseous flow PFG coming from the oxidation reactor 106 is exothermal of:

$$15{,}802.72+3{,}553.286=19{,}356.008 \text{ kJ}$$

While e.g. the holder of oxygen is NiO (NiO in active state and Ni in inactive state), 70.523 moles of MeO are required to oxidize 55.84 moles of CO and 14.683 moles of $H_2$. The reduction of 70.523 moles of MeO into 70.523 moles of Me, taking the example of NiO in Ni, is endothermal for:

$$70.523 \text{ mols} \times 244.30 \text{ kJ/mol}=17{,}066.566 \text{ kJ}$$

Finally, the thermal balance of the reaction in the oxidation reactor is exothermal and generates: 2,289.442 kJ.

The second gaseous flow DFG exiting from the oxidation reactor is composed by the $CO_2$ resulting from the reaction+ eventually the "excess" of heating $CO_2$+water steam as generated by the oxidation of $H_2$, i.e.:

2.457 kg of $CO_2$ from the reaction (55.84 moles, 1.252 $Nm^3$)+

0.536 kg of $H_2O_g$ from the reaction (29.76 moles, 0.667 $Nm^3$)

i.e. 22% by mass and 53% by volume.

This second gaseous flow DFG is at a temperature ≥900° C. and contains an important thermal power: 3,573.083 kJ of thermal capacity+2,228.951 kJ of enthalpy of the 29.762 moles ($H_2O_g$) to be condensed in liquid $H_2O$, i.e.: 5,802.034 kJ That thermal power is used in a thermal exchanging system 116 to generate the gaseous flow of treatment FGT. Said gaseous flow of treatment FGT essentially comprises:

the portion of the second gaseous flow DFG to be maintained after having changed its thermal capacity in said exchanger 116 with cold and dry $CO_2$ (coming from stock 114) which will have been partly de-humidified during said thermal exchange;

the portion of dry $CO_2$, coming from the stock 114, which will have served as a cold source in the thermal exchanger 116, will be used to temper said gaseous flow of treatment FGT (according to de-humidification and cooling requirements, said dry $CO_2$ from stock 114 may be in excess; the excess is then reintroduced in the cooling system 118 for recycling).

Said gaseous flow of treatment FGT will then be taken to the temperature required for the treatment of raw materials (working temperature: 30 to ≥300° C. and higher for treatments under high temperatures) and its residual humidity will be minimum.

To this step of the system and process of the invention, the thermal balance is already positive for:

−4,223.38 kJ of thermal supply to the reactions of the gasification reactor for 1 kg (MPCS/biomass);

+2,289.442 kJ of exotherm to the oxidation reactor of the first gaseous flow "fuel";

+5,802.034 kJ of thermal capacity available for the second gaseous flow DFG exiting from the oxidation reactor.

I.e. a positive total per kg of used biomass MPCS of:

2,289.442 kJ+5,802.034=8,091.476−4,223.38 kJ=3,868.096 kJ

At the Outlet of the Activation Reactor

The reactivation of Me in MeO is exothermal: 244.30 kJ/mol.

In the example, we have 70.523 moles of Me per kg of MPCS of used biomass. Considering thermal power as generated in this activation reactor: +17,228.769 kJ/kg of MPCS of used biomass.

The gasification $CO_2$ will acquire its thermal capacity from the exchanger E1 (i.e. 4,223.38 kJ/kg of MPCS, considering the preceding balance.

The final power balance of the reactions and exchanges of the system/process of the invention is:

3,868.096+17,228.769=21,096.865 kJ/kg of MPCS.

Considering also 89% of the power potential of the raw material.

This whole power is available for application and the production of working powers for the system and process of the invention.

This available power will be explored to enable the treatment of raw materials in a thermal treatment system. A large portion of this power is excessive and can be used for the co-generation of energies, useful to corresponding applications, be them mechanical and/or converted into electricity.

In the present invention, the thermal treatment system for raw materials can be a system of:

Drying:

of all raw materials to be de-humidified and/or de-hydrated before being used in a manufacturing process;

of all raw material and/or manufactured product which should be dried before being used and/or conditioned;

Thermal Treatment:

of all sensitive raw material (in its composition) to $CO_2$ interaction and should be submitted to diffuse heating as evenly as possible and/or at high temperatures (up to 1000/1100° C. and above as a function of the interaction as required by the heat carrier $CO_2$ with optimal kinetics) before its use in a manufacturing process;

of all raw materials and/or manufactured product which should be thermically treated (for thermochemical and/or thermophysical modifications/neutralizations before the use and/or conditioning).

The invention is surely not limited to the examples as disclosed.

What is claimed is:

1. A process to supply power to a thermal treatment system of raw material, the process comprising:

gasifying dry material containing carbon in a gasification reactor for dry raw material containing carbon (MPCS) with a gaseous flow of gasification (FGG) containing $CO_2$ at a temperature higher than 900° C. and oxygen ($O_2$), the gasifying supplying a first gaseous flow (PFG) comprising molecules of carbon monoxide, di-hydrogen and water steam;

oxidizing the first gaseous flow in an oxidation reactor by oxygen holders in an oxidized state (MeO, where Me is a metal) of the molecules of carbon monoxide and di-hydrogen as present in said first gaseous flow (PFG), to supply a second gaseous flow (DFG) at a temperature higher than 900° C. and comprising $CO_2$, water steam and oxygen holders in a reduced state (Me), wherein the temperature of the second gaseous flow imparts thermal power to the second gaseous flow;

activating the oxygen holders in a reduced state within an activation reactor with a gaseous flow (FAP) comprising elements of oxygen, the activating supplying oxygen holders in oxidized state (MeO) and an excess of thermal power;

supplying one or more of at least a part of the thermal power of said second gaseous flow (DFG) or the excess thermal power from the activating to the thermal treatment system for raw material; and increasing of temperature of the gaseous flow of gasification (FGG) with at least a part of the excess thermal power from the activating of oxygen holders to increase the temperature of the gaseous flow of gasification (FGG) to the gasification temperature.

2. The process of claim 1, comprising the supplying of at least a part of the thermal power to the thermal treatment system for raw material by supplying of at least a part of the second gaseous flow (DFG) to the thermal treatment system for raw material for use as a gaseous thermal treatment flow (FGT).

3. The process of claim 2, further comprising a reduction in the temperature of the at least a part of the second gaseous flow (DFG) before the use as the gaseous flow of treatment (FGT).

4. The process of claim 2, wherein the process is conducted in a thermal process supply system comprising the gasification reactor, the oxidation reactor, and the activation reactor, the process further comprising closed circuit recycling from the thermal treatment system for raw material to the thermal process supply system of at least one part of the $CO_2$ present in the gaseous flow of treatment as a gaseous flow of loaded thermal treatment (FGTC) at an outlet of the thermal treatment system, said recycling in closed circuit comprises a step of separating $CO_2$ from water steam in the loaded gaseous flow of treatment (FGTC), wherein the separated $CO_2$ is recycled to constitute at least in part the gaseous flow of gasification.

5. The process of claim 1, wherein the supplying comprises transference of the one or more of the thermal power or the excess thermal power to a gaseous flow of thermal treatment.

6. The process of claim 5, further comprising closed circuit recycling of at least a part of $CO_2$ from the second gaseous flow (DFG) to constitute said gaseous flow of gasification.

7. The process of claim 1, wherein the activating comprises an oxidation of said oxygen holders in reduced state (Me) by pre-heated atmospheric air (FAP).

8. The process of claim 4, wherein the activating comprises an oxidation of said oxygen holders in reduced state (Me) by pre-heated atmospheric air (FAP).

9. The process of claim 8, wherein the pre-treated atmospheric air is pre-heated in a step comprising transference of thermal power after the gaseous flow of loaded thermal treatment (FGTC) at the outlet of the thermal treatment system to said atmospheric air.

* * * * *